US012658346B2

(12) United States Patent
Song et al.

(10) Patent No.: US 12,658,346 B2
(45) Date of Patent: Jun. 16, 2026

(54) QUENCH PROTECTION CIRCUIT FOR SUPERCONDUCTING MAGNET SYSTEM BASED ON DISTRIBUTED HEATER NETWORK

(71) Applicant: HUAZHONG UNIVERSITY OF SCIENCE AND TECHNOLOGY, Hubei (CN)

(72) Inventors: Yunxing Song, Hubei (CN); Liang Li, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 975 days.

(21) Appl. No.: 17/799,928

(22) PCT Filed: Oct. 22, 2021

(86) PCT No.: PCT/CN2021/125452

§ 371 (c)(1),
(2) Date: Aug. 16, 2022

(87) PCT Pub. No.: WO2022/160796

PCT Pub. Date: Aug. 4, 2022

(65) Prior Publication Data

US 2023/0065221 A1 Mar. 2, 2023

(30) Foreign Application Priority Data

Jan. 27, 2021 (CN) ........................ 202110107868.1

(51) Int. Cl.
*H01F 6/02* (2006.01)

(52) U.S. Cl.
CPC ..................................... *H01F 6/02* (2013.01)

(58) Field of Classification Search
CPC ....................................................... H01F 6/02
See application file for complete search history.

(56) References Cited

U.S. PATENT DOCUMENTS 6,147,844 A 11/2000 Huang et al.
2006/0158795 A1* 7/2006 Tsuchiya ................ H02H 7/001 361/19
2013/0106545 A1* 5/2013 Wang ........................ H01F 6/02 335/216

FOREIGN PATENT DOCUMENTS

CN 106558869 4/2017
CN 107221401 9/2017
CN 112908608 6/2021

OTHER PUBLICATIONS

"International Search Report (Form PCT/ISA/210) of PCT/CN2021/125452," mailed on Jan. 13, 2022, with English translation thereof, pp. 1-4.

(Continued)

*Primary Examiner* — Paul A Wartalowicz
(74) *Attorney, Agent, or Firm* — JCIPRNET

(57) ABSTRACT

The disclosure belongs to the field of quench protection of a superconducting magnet system and specifically relates to a quench protection circuit for a superconducting magnet system based on a distributed heater network including M superconducting coils connected in series and a heater network formed by N heater modules, where M>N and N≤3. Different heater modules are connected in parallel with different superconducting coil subsets, and all superconducting coil subsets have spatial symmetry. Each heater module has m parallel branches, and each parallel branch has n heaters connected in parallel, where m≥1, n≥1, and when N=1, m>1. Each heater in the heater network is thermally coupled to one superconducting coil among the M superconducting coils, and each superconducting coil is thermally coupled to at least one heater in each heater module.

3 Claims, 5 Drawing Sheets

(56) References Cited

OTHER PUBLICATIONS

"Written Opinion of the International Searching Authority (Form PCT/ISA/237) of PCT/CN2021/125452," mailed on Jan. 13, 2022, pp. 1-4.

* cited by examiner

QUENCH PROTECTION CIRCUIT FOR SUPERCONDUCTING MAGNET SYSTEM BASED ON DISTRIBUTED HEATER NETWORK

CROSS-REFERENCE TO RELATED APPLICATION

This application is a 371 of international application of PCT application serial no. PCT/CN2021/125452, filed on Oct. 22, 2021, which claims the priority benefit of China application no. 202110107868.1, filed on Jan. 27, 2021. The entirety of each of the above mentioned patent applications is hereby incorporated by reference herein and made a part of this specification.

TECHNICAL FIELD

The disclosure belongs to the field of quench protection of a superconducting magnet system, and in particular, relates to a quench protection circuit for a superconducting magnet system based on a distributed heater network.

BACKGROUND

It is well known that superconducting magnets are smaller in size, have higher current density, consume less energy, and exhibit greater magnetic field strength compared with resistive magnets, and thus are widely applied in various fields including basic scientific research, medical and health care, transportation, defense industry, and electrical engineering. In particular, superconducting magnet systems are widely applied in the fields of NMR and MRI. However, there are conditions for a superconducting magnet to maintain a superconducting state, which is constrained by temperature, current, magnetic field, and even strain. As long as any one or several variables beyond the critical interval of the superconducting wire, the superconducting magnet in normal operation will return from the superconducting state to the resistive state and thereby losing its superconducting characteristic (i.e., quench).

During normal ramp-up, ramp-down or steady-state operation, the superconducting magnet is in a superconducting state, that is, a resistance-free state. However, once a local disturbance occurs (such disturbance may be a mechanical, temperature, air pressure, or electromagnetic disturbance), a tiny normal region will appear inside the superconducting magnet. If this normal region is not controllable, it will continue to expand until the entire magnet quenches. The temperature of the superconducting wire where the normal region first appears will be so high that the wire may melt, and the superconducting magnet may thus be destroyed. Further, during the quenching process, the superconducting magnet terminal voltages or interlayer voltages may be extremely high, resulting in flashover between conductors and eventually destroying the superconducting magnet. If a specific protection circuit is used to deliberately quench all superconducting coils at the same time when a tiny normal region appears in the magnet so that the energy is released as uniformly as possible to the volumes of all superconducting coils, the magnet temperature and terminal voltage will be greatly reduced, and the superconducting magnet is thereby protected. A circuit that is used to implements this function is called a quench protection circuit. Typically, this may be achieved by a distributed heater network attached to predetermined locations of the magnet coils.

FIG. 1 shows a typical quench protection circuit (10) for a superconducting magnet according to the prior art including eight superconducting coils L1-L8 (101) connected in series. The superconducting coil subsets L1 and L8 are active shielding coils, and current directions thereof are opposite to the current directions of the superconducting coil subsets L2-L7. A heater is attached to the surface of each superconducting coil in thermal contact with the superconducting coil. These heaters are connected in series to form a heater network 105. The heater network 105 and a second diode pack 106 are connected in series and are together connected in parallel with the superconducting coil subsets L3-L6. A pair of current leads 104 are connected to both ends of the superconducting coils 101 for connection with an excitation power supply. A low temperature superconducting switch 103 and the current leads 104 are connected in parallel. A first diode pack 102 and the low temperature superconducting switch 103 are connected in parallel. The threshold voltage of the first diode pack 102 is higher than the maximum excitation voltage at both ends of the magnet for protecting the low temperature superconducting switch 103. When the magnet is in ramp-up or ramp-down, the second diode pack 106 prevents the heater network 105 from conducting electricity, preventing the quench protection circuit from malfunctioning and causing the magnet to quench. The threshold voltage of the second diode pack 106 is selected to be higher than the maximum voltage across L3-L6 during ramp-up or ramp-down. Each of the diode packs 102 and 106 is usually formed by two groups of two or more diodes connected in series and then connected in anti-parallel. There are at least two defects in this circuit: 1) All heaters are connected in series, once there is an open circuit somewhere in the circuit, the superconducting coils 101 will lose protection completely. 2) All heaters are connected in series, resulting in an excessively high voltage across the coil subsets L3-L6, so when designing heaters, only heaters with smaller resistance can be designed. However, during the quenching process, the heating power of the heater is low, resulting in a slow quench protection response.

FIG. 2 shows another quench protection circuit (10) for a superconducting magnet according to the prior art including M (M=8) superconducting coils L1-L8 (101) connected in series. The superconducting coil subsets L1 and L8 are active shielding coils, and current directions thereof are opposite to the current directions of the superconducting coil subsets L2-L7. The heater network 105 is formed by M heater modules H1-H8. Each heater module includes a plurality of heaters, and each heater module is connected in parallel with one of the coils. Each heater module among the N (N≤M) heater modules includes at least M heaters, and each superconducting coil is thermally coupled to at least one heater in the heater module. Each heater module among the M-N heater modules includes at least one heater, and each superconducting coil among the N superconducting coils connected in parallel with the N heater modules is thermally coupled to at least one heater of each heater unit of the M-N heater modules. One pair of current leads 104 are connected to both ends of the superconducting coils 101 for connection with an excitation power supply. The low temperature superconducting switch 103 and the current leads 104 are connected in parallel. The first diode pack 102 and the low temperature superconducting switch 103 are connected in parallel. The threshold voltage of the first diode pack 102 is higher than the maximum excitation voltage at both ends of the magnet for protecting the low temperature superconducting switch 103. This type of quench protection circuit has at least 5 disadvantages: 1) Each heater module is connected in parallel with one of the superconducting coils. During the quenching process, the current flowing through each superconducting coil is different, resulting in a great unbalanced force inside the magnet system, and such a significant unbalanced force may cause structural damage to the superconducting magnet system. 2) Since the currents flowing through the superconducting coils are different, the contour lines of the stray field may expand outwards in space, which will bring about potential safety hazards. 3) Each heater module is not connected in series with a diode pack. As such, in the process of ramp-up or ramp-down, the heater network cannot be prevented from conducting electricity, which may trigger the malfunction of the quench protection circuit and cause the superconducting magnet to quench. 4) When N<M, the quench protection circuit cannot make all superconducting coils quench at the same time, so some coils have quench delay. 5) Since each heater module is connected in parallel with one of the superconducting coils, the connection of the quench protection circuit is complicated, a large number of heaters are required, and the cost is excessively high.

In view of the above, a new quench protection circuit which may be used to solve the above problems is thereby required to be provided.

SUMMARY

The disclosure provides a quench protection circuit for a superconducting magnet system based on a distributed heater network to solve the technical problem of limited applications of a quench protection circuit for a superconducting magnet system provided by the prior art due to an unbalanced force and stray field expansion caused by low protection reliability, slow circuit response, and unequal currents flowing through the symmetrical coils.

The technical solutions provided by the disclosure to solve the foregoing technical problem are provided as follows. The disclosure provides a quench protection circuit for a superconducting magnet system based on a distributed heater network including M superconducting coils connected in series and a heater network formed by N heater modules, where M>N and N≤3. Different heater modules are connected in parallel with different superconducting coil subsets, and all superconducting coil subsets have spatial symmetry. Each heater module has m parallel branches, and each parallel branch has n heaters connected in series, where m≥1, n≥1, and when N=1, m>1.

Each heater in the heater network is thermally coupled to one superconducting coil among the M superconducting coils, and each superconducting coil is thermally coupled to at least one heater in each heater module.

The beneficial effects provided by the disclosure include the following. The coil subsets from which the heater network obtains the voltage are distributed symmetrically in space. During the quenching process, the current difference flowing through the symmetrical coils may be controlled to a very low level. In this way, the magnitude of the unbalanced force may be controlled to an acceptable value, and the spatially outward expansion range of the stray field may also be controlled to an acceptable value. In particular, when N=1, the current difference is 0, the unbalanced force is 0, and the stray field does not expand outward in space. Moreover, the heater network is a regular and compact series-parallel network, and the reliability and quench response are greatly improved. Therefore, the solution of the present application can effectively solve the technical problems of the existing quench protection circuit, such as low protection reliability, slow circuit response, unbalanced force and stray field expansion caused by unequal currents flowing through the symmetrical coils.

On the basis of the above technical solutions, the present disclosure can also be improved as follows.

Further, when the heating power of one heater module is sufficient to quench the superconducting coils, the heater module is connected in series with a diode pack to prevent the quench protection circuit from malfunctioning and causing the superconducting coils to quench.

Further, each of the superconducting coil subset is formed by: one superconducting coil, plural superconducting coils, one superconducting sub-coil, or one superconducting subcoil and one superconducting coil. Herein, the superconducting sub-coil is a part of the superconducting coil.

The beneficial effects provided by the disclosure further include the following. Each superconducting coil subset may be a collection of any part of the coils, and the circuit connection mode may be flexibly designed according to actual needs.

Further, N=1, m>1, and m*n≥M.

The beneficial effects provided by the disclosure further include the following. The coil subsets from which the heater network obtains the voltage are distributed symmetrically in space, and the heater network includes only one heater module. During the quenching process, the currents flowing through the symmetrical coils are always the same, that is, the currents flowing through L1 and L8, L2 and L7, L3 and L6, and L4 and L5 are always equal. Therefore, the problem of unbalanced force does not occur, nor does the problem of the stray field expanding outwards in space. Besides, the heater network is a regular and compact series-parallel network. The reliability and quench response are greatly improved compared to the prior art. For instance, as long as there is still one branch conducting, all superconducting coils may not lose quench protection.

Further, N=2 and m*n≥M.

The beneficial effects provided by the disclosure further include the following. First, the coil subsets from which the heater network obtains the voltage are distributed symmetrically in space, and the two heater modules of the heater network have exactly the same structure. During the quenching process, the currents flowing through L3 and L4, L5 and L6, L1 and L2, and L7 and L8 are always equal, and the difference between the currents flowing through L1 and L8 and L2 and L7 may be controlled at a reasonable level. In this way, the magnitude of the unbalanced force may be controlled to an acceptable value, and the spatially outward expansion range of the stray field may also be controlled to an acceptable value. Moreover, the heater network is a regular and compact series-parallel network, and the reliability and quench response are greatly improved. The two heater modules in the heater network 105 back up each other, so even if one module is completely disconnected, the other module can protect all the superconducting coils 101. It thus can be seen that the circuit reliability is further improved.

Further, N=3 and m*n≥M.

The beneficial effects provided by the disclosure further include the following. First, the coil subsets from which the heater network obtains the voltage are distributed symmetrically in space, and the two heater modules located at the spatially symmetrical positions have exactly the same structure. During the quenching process, the currents flowing through L3 and L4, L5 and L6, L1 and L2, and L7 and L8 are always equal, and the difference between the currents flowing through L1 and L8 and L2 and L7 may be controlled at a reasonable level. In this way, the magnitude of the unbalanced force may be controlled to an acceptable value, and the spatially outward expansion range of the stray field may also be controlled to an acceptable value. Moreover, the heater network is a regular and compact series-parallel network, and the reliability and quench response are greatly improved. The three heater modules in the heater network 105 back up one another, so even if two modules are completely disconnected, the remaining one module can protect all the superconducting coils 101. It thus can be seen that the circuit reliability is further improved.

BRIEF DESCRIPTION OF THE DRAWINGS

In all the drawings, the same reference numerals are used to represent identical or similar elements or structures, where.

10 represents a quench protection circuit, 101 represents a superconducting coil, 102 represents a first diode pack, 103 represents a low temperature superconducting switch, 104 represents a current lead, 105 represents a heater network, 106 represents a second diode pack, and 1051, 1052, 1053 each represents a heater module.

DESCRIPTION OF THE EMBODIMENTS

In order to make the objectives, technical solutions and advantages of the disclosure clearer and more comprehensible, the disclosure will be further described in detail below with reference to the drawings and embodiments. It should be understood that the specific embodiments described herein are used to explain the disclosure merely, but not to limit the disclosure. In addition, the technical features involved in the various embodiments of the disclosure described below can be combined with each other as long as the technical features do not conflict with each other.

Figure 1:
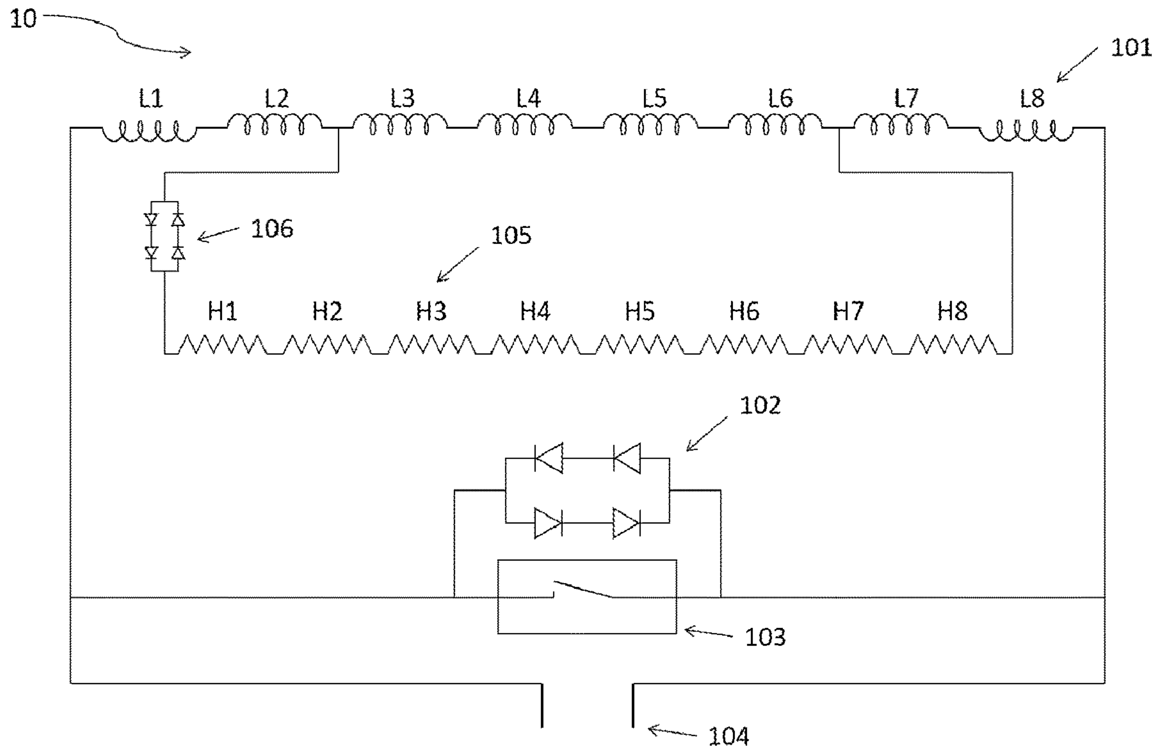
FIG. 1 (Prior Art)
FIG. 1 is a schematic diagram of a quench protection circuit according to the prior art.

The quench protection circuit of FIG. 1 has the following advantages: it can ensure that the currents through the symmetrical coils are always equal, that is, the currents flowing through L1 and L8, L2 and L7, L3 and L6, and L4 and L5 are always equal. However, this circuit has at least two defects, which are analyzed as follows: 1) All heaters are connected in series to form a single loop. But once there is an open circuit somewhere in the line, the heater network may not be able to obtain thermal power, such that the quench of the superconducting coils cannot be triggered, which may eventually lead to the complete loss of protection of the superconducting coils 101. 2) By connecting all the heaters in series to form a single loop, the design of the heaters may become difficult or a satisfactory design cannot even be obtained. This is because on the one hand, since the heater network is connected in series, the resistance across the heater network is considerably high. Even though the current flowing through the heater network 105 is very small, it will result in a very high voltage across the coil subsets L3-L6, and the superconducting coils have the risk of high voltage breakdown. On the other hand, in order to limit the voltage across L3-L6, the heater resistance needs to be selected to a smaller value. When the heating power of the heater is reduced, the quench protection response is slow, and eventually the hot spot temperature of the coils is higher, and the superconducting coils face the risk of high temperature melting.

Figure 2:
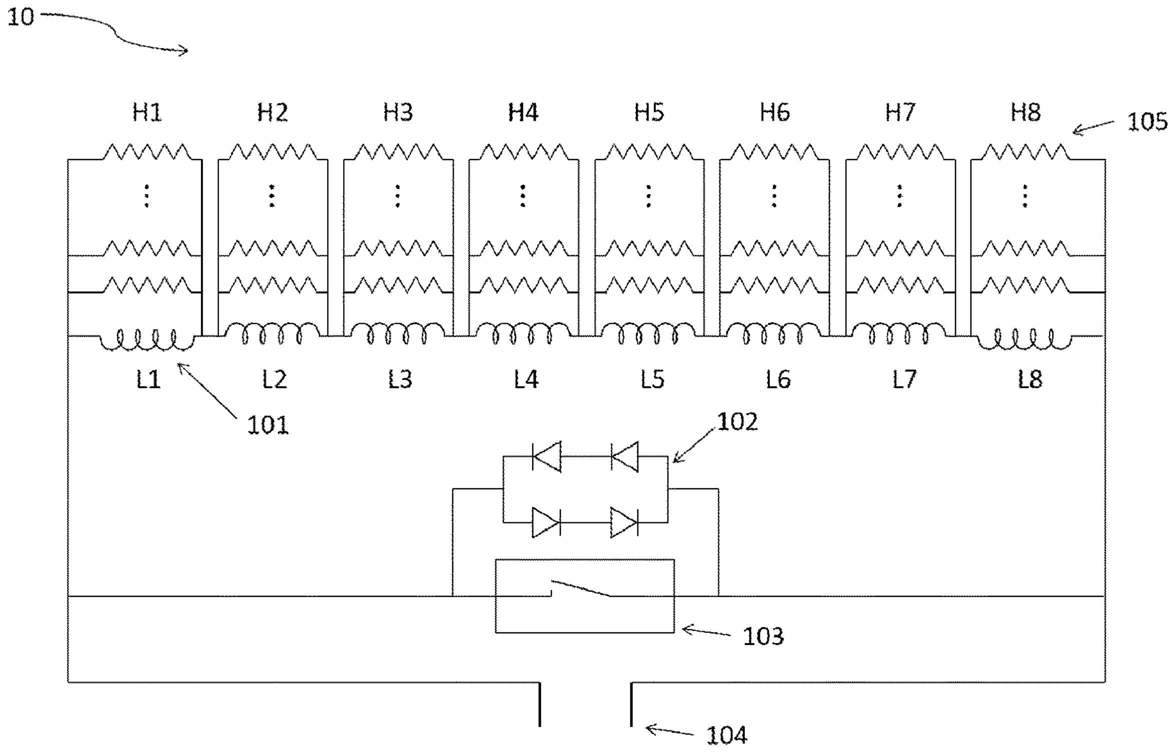
FIG. 2 (Prior Art)
FIG. 2 is a schematic diagram of another quench protection circuit according to the prior art.

The quench protection circuit in FIG. 2 has at least five shortcomings, which are analyzed as follows: 1) Each heater module is connected in parallel with one of the superconducting coils. During the quenching process, due to the different diffusion velocity and volume in the normal region of each superconducting coil, the terminal voltage of each superconducting coil is different, such that the current flowing through each superconducting coil is different, resulting in a great unbalanced force inside the magnet system. Such a significant unbalanced force may cause structural damage to the superconducting magnet system. 2) Since the currents flowing through the superconducting coils are different as analyzed above, the contour lines of the stray field may expand outwards in space, which will bring about potential safety hazards. 3) Each heater module is not connected in series with a diode pack. As such, in the process of ramp-up or ramp-down, the heater network cannot be prevented from conducting electricity, which may trigger the malfunction of the quench protection circuit and cause the magnet to quench. 4) When N<M, the quench protection circuit cannot make all superconducting coils quench at the same time, so some coils may have quench delay. For instance, N=1, 8 heaters are connected in parallel to the heater modules at both ends of L1, and one heater is connected in parallel at each end of the other coils. Assuming that L2 quenches first, the heaters at both ends of L2 build up a voltage first, and the heaters are pasted on the surface of L1 to trigger the quench of L1. After the voltage is built up across L1, L3 to L8 are triggered to quench. It thus can be seen that the quench of L3 to L8 is slower than that of L1. 5) Since each heater module is connected in parallel with one of the superconducting coils, the connection of the quench protection circuit is complicated, a large number of heaters are required, and the costs are excessively high. For instance, if N=M=8, the minimum number of heaters required is =M*N+M−N=64.

Based on the above analysis, the disclosure provides the following embodiments to solve the technical problems found in the quench protection circuit provided by the prior art.

Embodiment One

Figure 3:
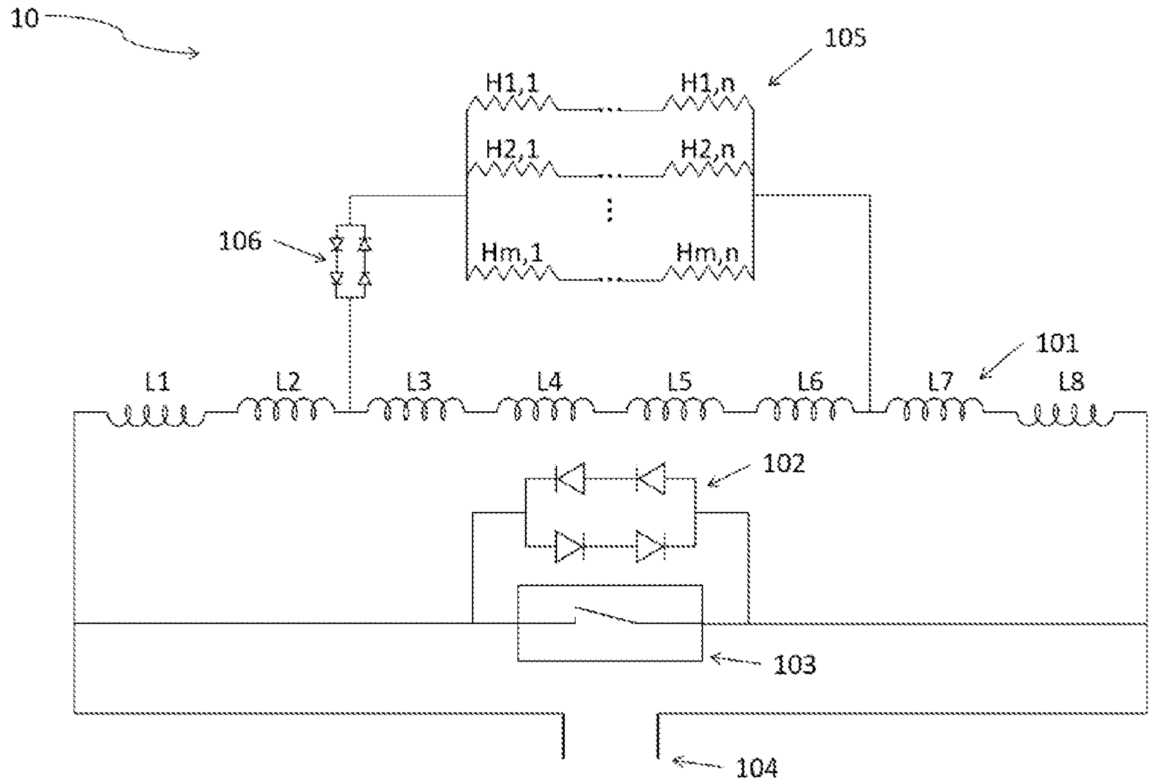
FIG. 3 is a schematic diagram of a quench protection circuit for a superconducting magnet system according to an embodiment of the disclosure.

Referring to FIG. 3, the quench protection circuit 10 includes M (M=8) superconducting coils L1-L8 (101) connected in series. The superconducting coil subsets L1 and L8 are active shielding coils, and current directions thereof are opposite to the current directions of the superconducting coil subsets L2-L7. A pair of current leads 104 are connected to both ends of the superconducting coils 101 for connection with an excitation power supply (not shown). The low temperature superconducting switch 103 and the current leads 104 are connected in parallel. The first diode pack 102 and the low temperature superconducting switch 103 are connected in parallel. The threshold voltage of the first diode pack 102 is higher than the maximum excitation voltage at both ends of the magnet for protecting the low temperature superconducting switch 103. Each heater in the heater network 105 is thermally coupled to one of the superconducting coils, and each superconducting coil is thermally coupled to at least one heater. The heater network 105 and the second diode pack 106 are connected in series and are together connected in parallel with the superconducting coil subsets L3-L6. When the magnet is in ramp-up or ramp-down, the second diode pack 106 prevents the heater network 105 from conducting electricity, preventing the quench protection circuit from malfunctioning and causing the magnet to quench. The threshold voltage of the second diode pack 106 is selected to be higher than the maximum voltage across L3-L6 during ramp-up or ramp-down.

During the ramp-up process, the low temperature superconducting switch 103 is heated by a heater (not shown), the low temperature superconducting switch 103 acts as a large resistor, most of the currents (from the excitation power supply) flow through the superconducting coils 101, and the excitation power supply magnetizes the superconducting coils 101. When the field of view of the superconducting magnet system reaches the target magnetic field, the power supply for heating the heater of the low temperature superconducting switch 103 is turned off, and the low temperature superconducting switch 103 returns to the superconducting state. Further, the voltage of the excitation power supply is adjusted to 0, and the current leads 104 are removed to limit heat loss into the superconducting magnet system, and the superconducting magnet system enters persistent mode.

During the ramp-down process, the low temperature superconducting switch 103 is heated by a heater (not shown), the low temperature superconducting switch 103 acts as a large resistor, and most of the currents flow through the superconducting coils 101, the current leads 104, and the excitation power supply. The excitation power supply outputs a reverse voltage to ramp-down. Sometimes in order to speed up the ramp-down, a DC load or diode is connected in series with the excitation power supply to create a higher voltage drop. When the current on the power dial shows 0, the excitation power supply may be turned off and the current leads 104 may be removed.

The heater network includes m ($m>1$) branches, and each branch is connected with n ($n\geq1$) heaters in series. In particular, when $m=8$ and $n=1$, FIG. 3 becomes FIG. 4, the heater networks H1-H8 are connected in parallel, and each superconducting coil is thermally coupled to one of the heaters.

Figure 4:
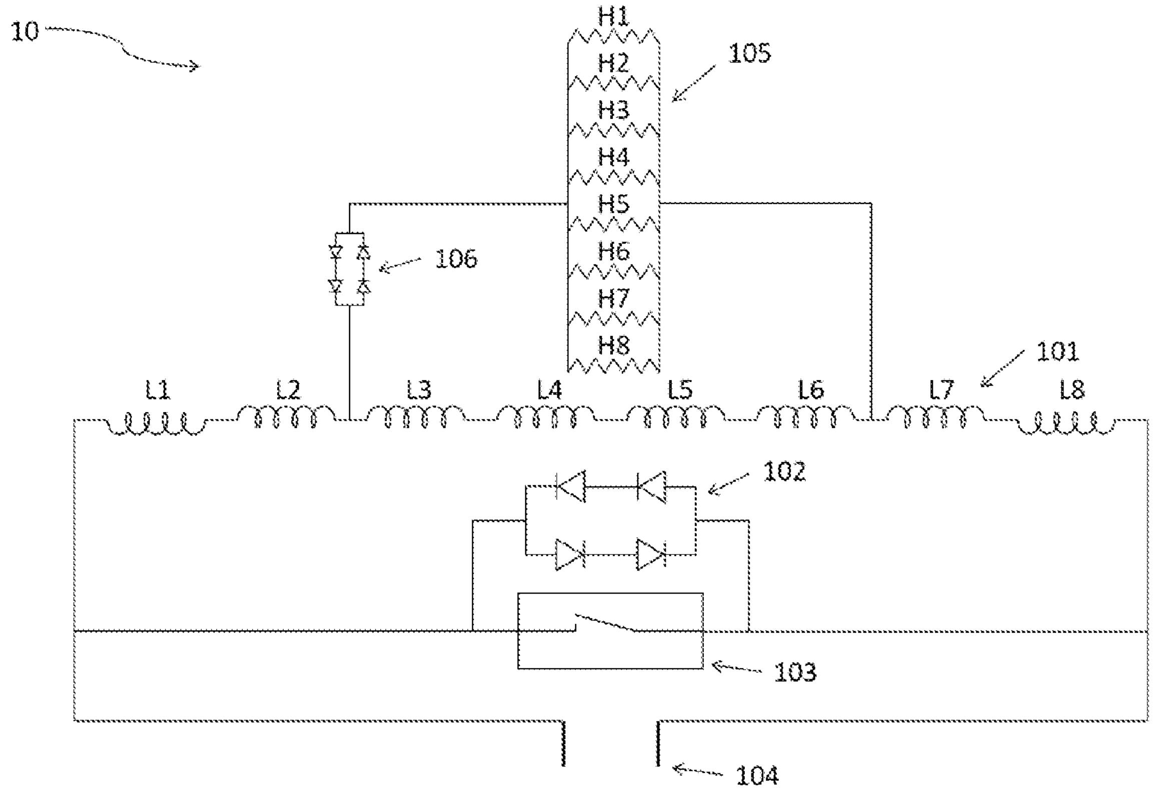
FIG. 4 is a schematic diagram of another quench protection circuit for a superconducting magnet system according to an embodiment of the disclosure.

Taking FIG. 4 as an example, the principle of the quench protection circuit is described. If the superconducting coil L4 quenches, the coil subset L3-L6 will quickly build up a voltage at both ends. This voltage provides thermal power to each heater in the heater network 105 to generate heat. These heaters, due to their thermal coupling to the superconducting coils, accelerate the L4 quench and quench all other coils that are not quenched. The protection of the superconducting coils 101 is achieved by converting the magnetic energy stored in the superconducting coils into thermal energy and allowing all volumes of all coils to absorb the energy as much as possible. In FIG. 4, all 8 heaters in the heater network are connected in parallel, and the reliability is greatly improved. Unless the entire heater network is open, the quench of the superconducting coil attached to the heater that is not open can always be triggered, so as not to be as shown in FIG. 1, once the circuit is open, the coil may lose the quench protection completely.

Depending on the design, any value>1 may be selected for m, and any value>1 may be selected for n, but the product of m and n must be ≥M, and make sure that each coil has at least one heater thermally coupled to it.

Figure 5:
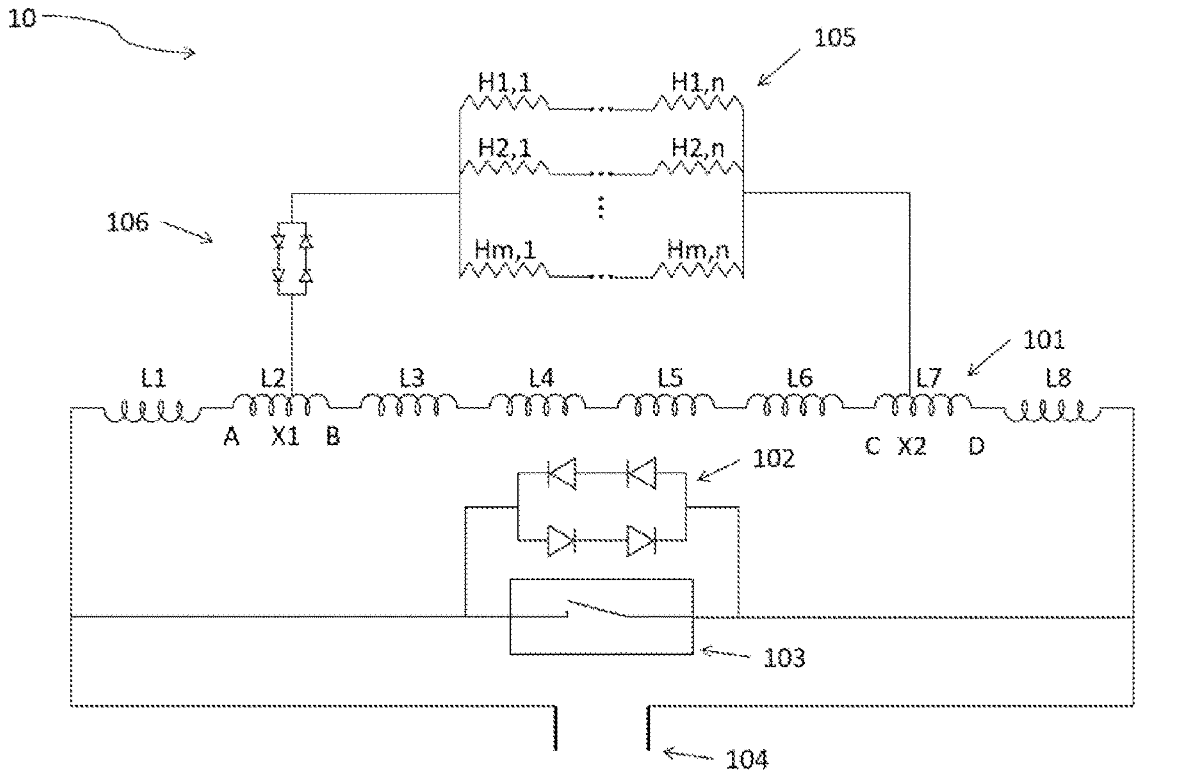
FIG. 5 is a schematic diagram of another quench protection circuit for a superconducting magnet system according to an embodiment of the disclosure.

In FIG. 3, the voltage of the heater network is obtained from the coil subsets L3-L6, and this is just an example. Depending on the design, the voltage of the heater network may be obtained from the voltage between any symmetrical coils (that is, the coil subsets connected in parallel with the heater network may expand or shrink along the spatially symmetrical position of the entire set of coils), and even one or more symmetrically positioned coils may be divided into several symmetrical sub-coils. The voltage of the heater network may be obtained from the voltage between any symmetrical coils including the sub-coils, an example of which is shown in FIG. 5. But the voltage of the heater network cannot be obtained from the voltage between the low temperature superconducting switches 103. If the coil is divided into several sub-coils, the physical location of the heater is not limited to the surface of the coil, but may be attached to the surface of the sub-coils.

The advantages of the quench protection circuit shown in FIG. 3 are: 1) The coil subsets from which the heater network obtains the voltage are spatially symmetrically distributed. During the quenching process, the currents flowing through the symmetrical coils are always the same, that is, the currents flowing through L1 and L8, L2 and L7, L3 and L6, and L4 and L5 are always equal. Therefore, the problem of unbalanced force does not occur, nor does the problem of the stray field expanding outwards in space. 2) The heater network is a regular and compact series-parallel network. The reliability and quench response are greatly improved compared to the prior art. For instance, as long as there is still one branch conducting, all superconducting coils may not lose quench protection.

Embodiment Two

Figure 6:
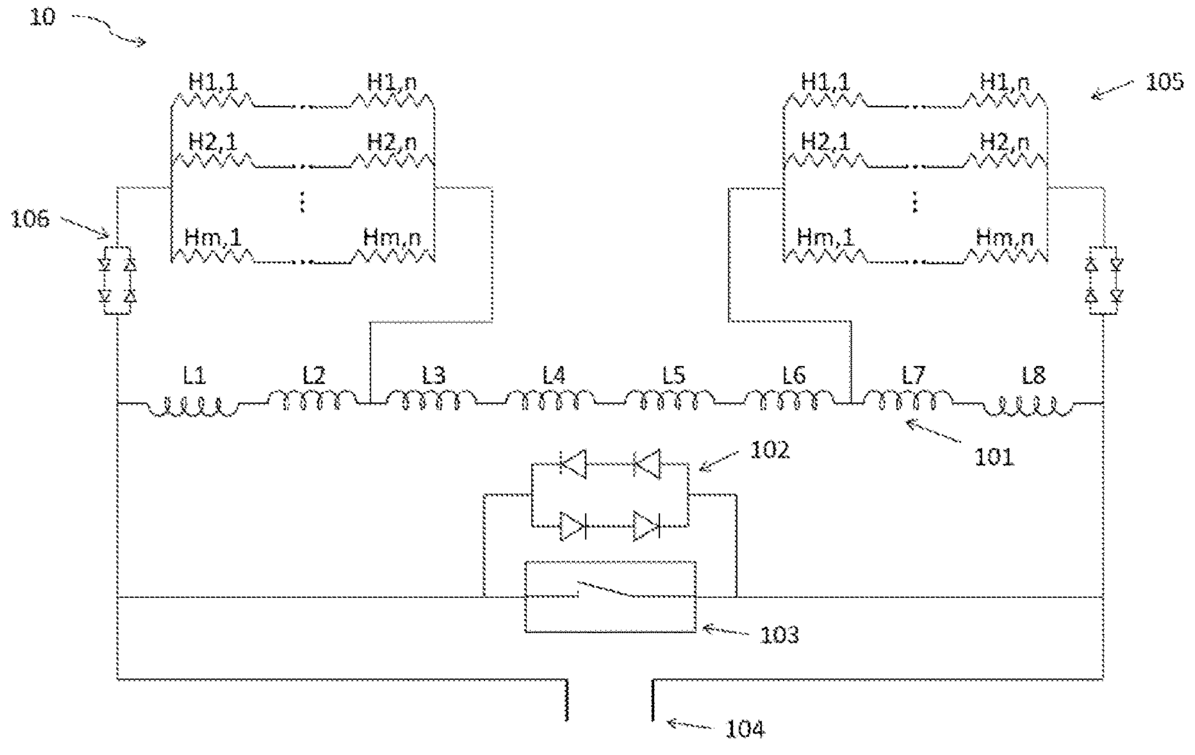
FIG. 6 is a schematic diagram of another quench protection circuit for a superconducting magnet system according to an embodiment of the disclosure.

Referring to FIG. 6, which is a schematic diagram of a quench protection circuit according to another embodiment of the disclosure. The heater network 105 includes two structurally identical heater modules, and the second diode pack 106 includes two structurally identical diode pack modules. One heater module in the heater network 105 and one diode module in the second diode pack 106 are connected in series and are together connected in parallel with the superconducting coil subsets L1-L2 or L7-L8. When the magnet is in ramp-up or ramp-down, the second diode pack 106 prevents the heater network 105 from conducting electricity, preventing the quench protection circuit from malfunctioning and causing the superconducting magnet to quench. The threshold voltage of any module in the second diode pack 106 is selected to be higher than the maximum voltage across L1-L2 and L7-L8 during the ramp-up or ramp-down process. Each heater of each heater module in the heater network 105 is thermally coupled to one of the superconducting coils, and each superconducting coil is thermally coupled to at least one heater of each heater module.

Any heater module in the heater network includes m (m≥1) branches, and each branch is connected with n (n≥1) heaters in series. Depending on the design, any value ≥1 may be selected for m and n, but the product of m and n must be ≥M while ensuring that each coil is thermally coupled to at least one heater in each heater module.

Figure 7:
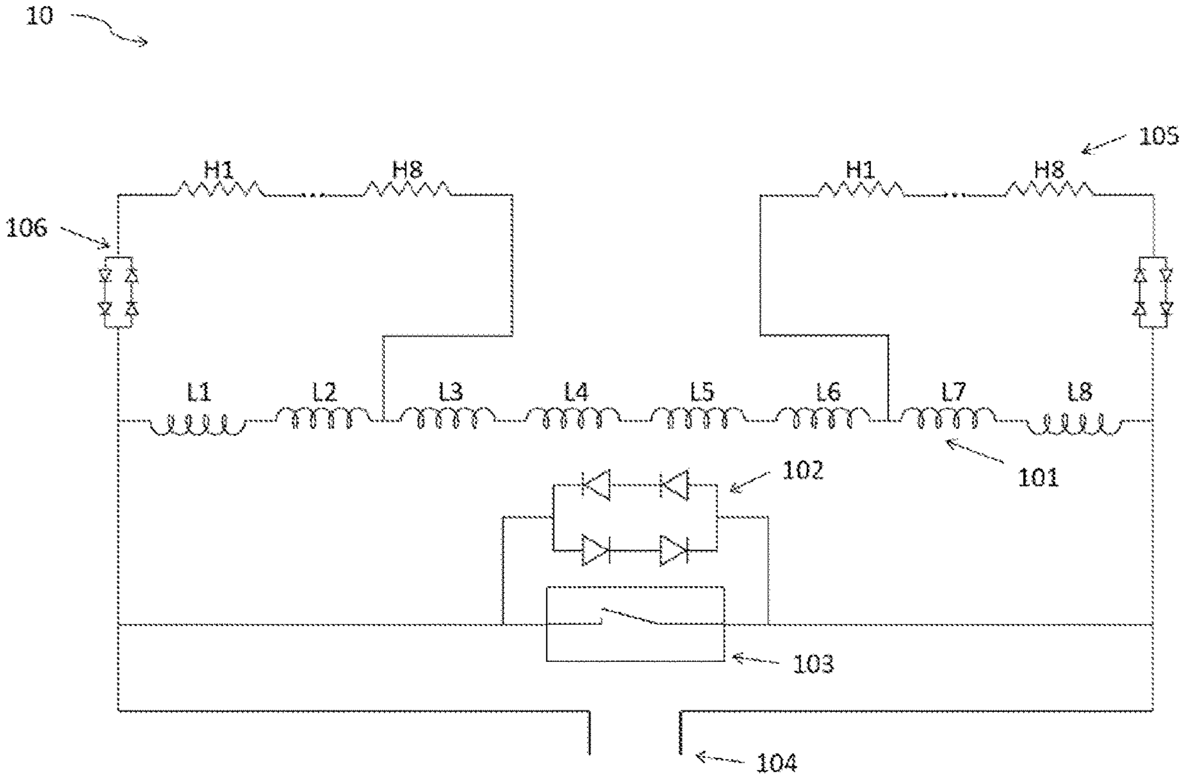
FIG. 7 is a schematic diagram of another quench protection circuit for a superconducting magnet system according to an embodiment of the disclosure.
Figure 8:
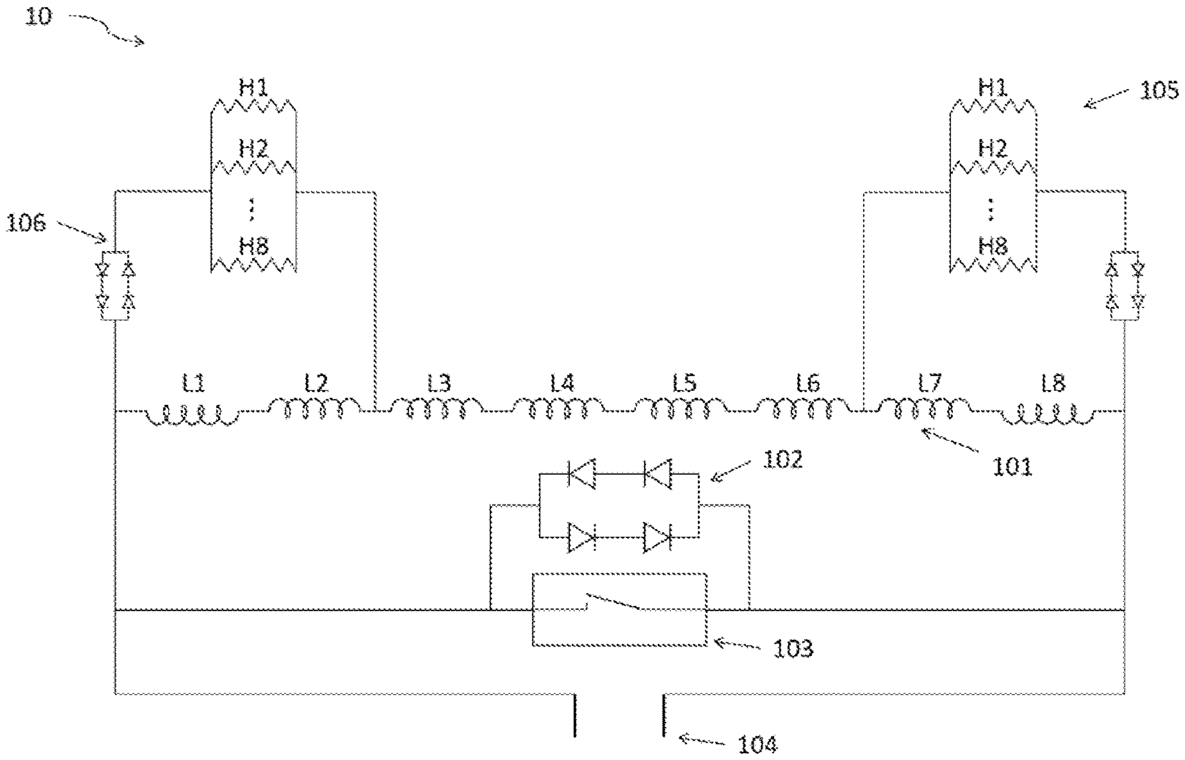
FIG. 8 is a schematic diagram of another quench protection circuit for a superconducting magnet system according to an embodiment of the disclosure.

In particular, 1) when m=1 and n=8, FIG. 6 becomes FIG. 7, the heater network contains two identical heater modules, each heater module only contains one branch, and each branch is formed by 8 heaters connected in series. Each superconducting coil is provided with two heaters from different heater modules. 2) when m=8 and n=1, FIG. 6 becomes FIG. 8, the heater network contains two identical heater modules, each heater module contains 8 branches connected in parallel, and each branch contains one heater only. Each superconducting coil is provided with two heaters from different heater modules.

In FIG. 6, the two heater modules back up each other, so even if one of the modules is completely disconnected, the other module can protect all the superconducting coils 101. It can thus be seen that the reliability of the circuit shown in FIG. 6 is further improved than that of the circuit shown in FIG. 3.

In FIG. 6, the voltage of the heater network is obtained from the coil subsets L1-L2 and L7-L8, and this is just an example. Depending on the design, the voltage of the heater network may be obtained from voltage between any symmetrical coils or symmetrical sub-coils, but not from L1-L4 and L5-L8 (the only special cases). Because in this case, if there is a symmetrical quench (such as a normal region of the same size at the symmetrical position of L1 and L8), the superconducting magnet may not be protected.

The advantages of the quench protection circuit shown in FIG. 6 are: 1) The coil subsets from which the heater network obtains the voltage are distributed symmetrically in space. During the quenching process, the currents flowing through L3 and L4, L5 and L6, L1 and L2, and L7 and L8 are always equal, and the difference between the currents flowing through L1 and L8 and L2 and L7 may be controlled at a reasonable level. In this way, the magnitude of the unbalanced force may be controlled to an acceptable value, and the spatially outward expansion range of the stray field may also be controlled to an acceptable value. 2) The heater network is a regular and compact series-parallel network, and the reliability and quench response are greatly improved. The two heater modules in the heater network 105 back up each other, so even if one module is completely disconnected, the other module can protect all the superconducting coils 101. It can thus be seen that the reliability of the circuit shown in FIG. 6 is further improved than that of the circuit shown in FIG. 3.

Embodiment Three

Figure 9:
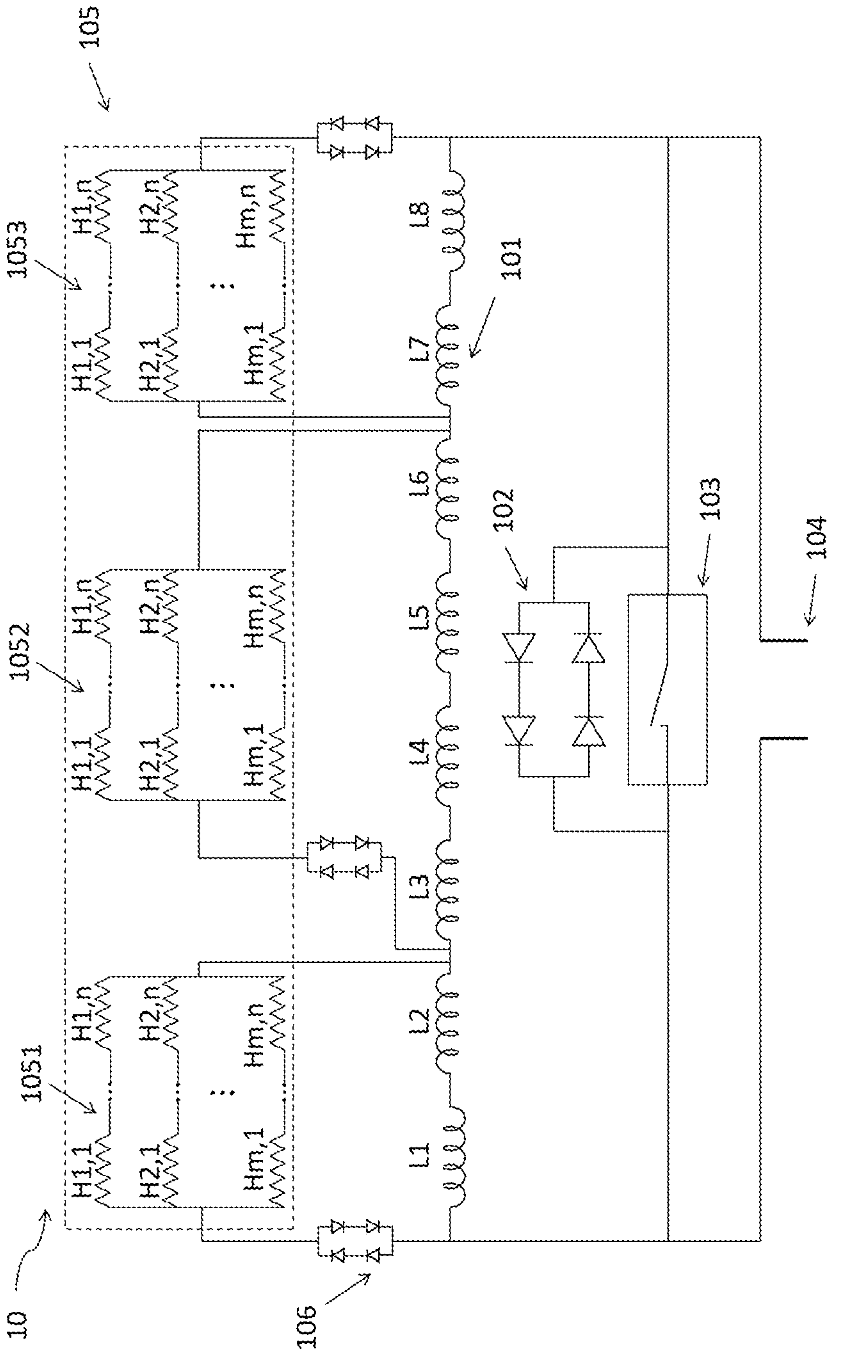
FIG. 9 is a schematic diagram of another quench protection circuit for a superconducting magnet system according to an embodiment of the disclosure.

Referring to FIG. 9, which is a diagram of a quench protection circuit according to another embodiment of the disclosure. The quench protection circuit 10 includes M (M=8) superconducting coils L1-L8 (101) connected in series. The superconducting coil subsets L1 and L8 are active shielding coils, and current directions thereof are opposite to the current directions of the superconducting coil subsets L2-L7. A pair of current leads 104 are connected to the superconducting coils 101 for connection with an excitation power supply. The low temperature superconducting switch 103 and the current leads 104 are connected in parallel. The first diode pack 102 and the low temperature superconducting switch 103 are connected in parallel. The threshold voltage of the first diode pack 102 is higher than the maximum excitation voltage at both ends of the superconducting magnet for protecting the low temperature superconducting switch 103. Each heater of each heater module in the heater network 105 is thermally coupled to one of the superconducting coils, and each superconducting coil is thermally coupled to at least one heater of each heater module.

The heater network 105 includes 3 heater modules, each heater module has m (m≥1) parallel branches, each parallel branch has n (n≥1) heaters connected in series, and the heater modules 1051 and 1053 are structurally identical, where m*n≥M. The second diode pack 106 includes 3 structurally identical diode pack modules. One heater module in the heater network 105 and one diode module in the second diode pack 106 are connected in series and then are connected with corresponding superconducting coil subsets (sub L1-L2, L3-L6, and L7-L8) in parallel. The threshold voltage of any module in the second diode pack 106 is selected to be higher than the maximum voltage across L1-L2, L3-L6, and L7-L8 during the ramp-up or ramp-down process.

In FIG. 9, the voltage of the heater network is obtained from the coil subsets L1-L2, L3-L6, and L7-L8, and this is just an example. Depending on the design, the voltage of the heater network may be obtained from voltage between any symmetrical coils or symmetrical sub-coils.

The advantages of the quench protection circuit shown in FIG. 9 are: 1) The coil subsets from which the heater network obtains the voltage are distributed symmetrically in space. During the quenching process, the currents flowing through L3 and L4, L5 and L6, L1 and L2, and L7 and L8 are always equal, and the difference between the currents flowing through L1 and L8 and L2 and L7 may be controlled at a reasonable level. In this way, the magnitude of the unbalanced force may be controlled to an acceptable value, and the spatially outward expansion range of the stray field may also be controlled to an acceptable value. 2) The heater network is a regular and compact series-parallel network, and the reliability and quench response are greatly improved. The three heater modules in the heater network 105 back up one another, so even if two modules are completely disconnected, the remaining one module can protect all the superconducting coils 101. It can thus be seen that the reliability of the circuit shown in FIG. 9 is further improved than that of the circuit shown in FIG. 6.

The heater network shown in FIG. 9 includes three heater modules, so it is easy to think that if the heater modules are increased to M modules, the reliability of the quench protection circuit may be significantly increased. However, if the number of heater modules continues to grow, the disadvantage is that the inconsistency of the current may greatly increase, bring an unbalanced force and causing the stray field to expand spatially outward and become uncontrollable. Therefore, the number of heater modules is limited to be N≤3 in the disclosure.

A person having ordinary skill in the art should be able to easily understand that the above description is only preferred embodiments of the disclosure and is not intended to limit the disclosure. Any modifications, equivalent replacements, and improvement made without departing from the spirit and principles of the disclosure should fall within the protection scope of the disclosure.

What is claimed is:

1. A quench protection circuit for a superconducting magnet system based on a distributed heater network, comprising: M superconducting coils connected in series and a heater network formed by N heater modules, where M>N and N≤3, wherein the different heater modules are connected in parallel with different superconducting coil subsets, wherein each of the superconducting coil subsets is formed by: one superconducting coil, plural superconducting coils, one superconducting sub-coil, or one superconducting sub-coil and one superconducting coil, wherein the superconducting sub-coil is a part of the superconducting coil, wherein each of the heater modules has m parallel branches, and each of the parallel branches has n heaters connected in series, where m≥1, n≥1, and when N=1, m≥1, wherein each of the heaters in the heater network is thermally coupled to one superconducting coil among the M superconducting coils, and each of the superconducting coil is thermally coupled to at least one of the heaters in each of the heater modules, m*n≥M, wherein when N=1, m>1 and n>1, the superconducting coil subsets connected in parallel with the heater modules have spatial symmetry;

wherein when N=2, m≥1 and n≥1, two superconducting coil subsets connected in parallel with two corresponding heater modules have spatial symmetry, a union of the two superconducting coil subsets is less than the M superconducting coils, and the two corresponding heater modules have the same circuit structures and back up each other in function;

wherein when N=3, m≥1 and n≥1, three superconducting coil subsets connected in parallel with three corresponding heater modules have spatial symmetry, two heater modules in symmetrical positions have the same circuit structures and back up each other in function.

2. The quench protection circuit for the superconducting magnet system based on the distributed heater network according to claim 1, wherein when heating power of one heater module of the heater modules is sufficient to quench the superconducting coils, the heater module is connected in series with a diode pack.

3. The quench protection circuit for the superconducting magnet system based on the distributed heater network according to claim 1, wherein circuit structures of two of the heater modules connected in parallel with the coil subsets in symmetrical positions with each other are the same.

* * * * *